FREQUENCY SYNTHESIZER

Filed Jan. 17, 1969 2 Sheets-Sheet 1

INVENTOR
NOEL E. BRAYMER

BY Nilsson Robbins
ATTORNEYS

INVENTOR
NOEL E. BRAYMER
BY Nilsson + Robbins
ATTORNEYS

United States Patent Office 3,555,446

Patented Jan. 12, 1971

3,555,446
FREQUENCY SYNTHESIZER

Noel B. Braymer, Costa Mesa, Calif., assignor to Dana Laboratories, Inc., Irvine, Calif., a corporation of California Filed Jan. 17, 1969, Ser. No. 791,912
Int. Cl. H03b 3/08
U.S. Cl. 331—16 14 Claims

ABSTRACT OF THE DISCLOSURE

A frequency synthesizer is a means for producing a periodic, electrical signal at a frequency which is selected numerically. The preferred form of frequency synthesizer produces a signal which is phase coherent with a fixed frequency, reference periodic signal. The signal is considered to be phase coherent if it produces N cycles during the time interval in which the reference signal computes M cycles. Both M and N must be integers, but may be large.

The frequency of the reference signal, $f_{ref}$ and the integer M are usually fixed and are selected to make N direct reading in Hertz (cycles per second), except for a simple scale factor. For example, if $f_{ref}$ is 1,000,000 Hertz and M is 1,000, N will be direct reading in kilohertz (thousands of Hertz).

The number N may be fixed, but is usually variable over a considerable span.

A selected frequency can be synthesized by repeated manipulations of periodic signals. This is called "direct synthesis." The basic manipulations are the addition or subtraction of the frequencies of a pair of periodic signals and the multiplication or division of a single frequency by a small integer. Each of these manipulations produces a periodic signal at the desired frequency, but also produces periodic signals at undesired, or spurious frequencies. It is necessary to enhance the magnitude of the desired signal, relative to the undesired signals by filtering.

If N is variable, direct frequency synthesis requires an average of about four manipulations and four filters per decimal digit of resolution. To directly synthesize frequencies up to 9,999,000 Hertz in increments of 1,000 Hertz requires about $4\times4=16$ manipulations and about 16 filters. To synthesize frequencies up to 9,999,999 Hertz in increments of one Hertz requires about $7\times4=28$ manipulations and about 28 filters. Each manipulations plus filter requires equipment comparable in complexity and cost to a superheterodyne radio receiver.

Due to the great complexity and consequent high cost of a frequency synthesizer using direct synthesis exclusively, only a small number of the possible applications can justify this type of synthesizer.

A frequency can also be synthesized indirectly. In indirect synthesis, an electronically tuned source of a periodic signal generates the desired signal. The frequency, and the phase of the generated signal is automatically controlled.

In previously disclosed types of frequency synthesizers, the periodic signal has been phase locked to an integer harmonic of the frequency $(f_{ref}/M)$. In this case, the minimum frequency increment is equal to $(f_{ref}/M)$ and the time required for the output frequency $f_{out}$ to settle to a new value is on the order of $(100\ M/f_{ref})$. If the minimum frequency increment were 1000 Hertz, the time required to settle to a new frequency would be on the order of 0.1 second.

If the change in frequency is large, the phase lock loop will lose lock. In this case, some auxiliary means are needed to "capture" the reference signal and the time required to complete the change may be many times the normal, small change settling time.

In previously disclosed types of indirect frequency synthesizers, the output completes N cycles in the time interval in which the reference periodic signal completes M cycles. The frequency, averaged over M cycles of the reference is correct, but the instantaneous frequency fluctuates about this average. The magnitude of these fluctuations increases as the minimum frequency increment is decreased. In many applications, these fluctuations are excessive if the minimum frequency increment is not 1000 Hertz or greater.

In a frequency synthesizer embodying the invention, synthesis is indirect. However, the time required to settle to a new frequency, after N is changed, is independent of the minimum frequency increment. This time can be small and consequently the random frequency fluctuations can be small, even if the minimum frequency increment is a minute fraction of one Hertz. In addition, any frequency within the nominal band of the periodic signal source can be selected in a short time. The phase lock is never broken and no auxiliary "capture" means are needed.

In a frequency synthesizer embodying the invention both a selected frequency and a selected phase can be synthesized. Also, in this frequency synthesizer, the frequency synthesized need not be constant but can be varied continuously in time as in a swept frequency signal source.

In a frequency synthesizer embodying the invention, an electronically tuned signal source is used to generate a periodic signal. The frequency $f_s$ of this periodic signal is variable under control of the tuning signal. The phase angle generated by this periodic signal is measured, in cycles, by an electronic, digital counter. The instants at which this phase angle reaches certain values are compared to a digitally computed schedule. If the phase angle lags the schedule, frequency is increased; if the phase angle leads the schedule, frequency is decreased.

Specifically, the whole number C produced by, and stored in, the counter is compared digitally to a whole number $(D+E)$. The results of this comparison include a binary signal. This binary signal is a 0 if C is not greater than $(D+E)$; this signal is a 1 if C greater than $(D+E)$. The transition of this signal, as C increases, from a 0 to a 1 is precisely synchronized to the periodic signal at frequency $f_s$. This transition is called the feedback pulse-edge.

The small integer E is used solely to enhance the precision of the time of the feedback pulse-edge. The value of E is fixed.

The value of the integer D is increased once every $(m/f_{ref})$ seconds, where $m$ is an integer. In equilibrium, these periodic increases will cause the binary comparison signal to alternate between 0 and 1. This produces a train of feedback pulse-edges.

A train of reference pulse-edges are also generated at the rate of one edge every $(m/f_{ref})$ seconds. The time interval between a given reference pulse-edge and its complementary feedback pulse edge has a scheduled value. The difference between the scheduled time interval and the observed time interval is converted into a voltage. This voltage is sampled, held, additionally processed, and added to the control signal. The sense of this incremental signal tends to change frequency in the sense which will reduce the error in subsequent corrections.

The additional processing may include filtering, amplification, and other conventional signal processes.

The normal departures of the feedback pulse edge are less than $[\pm(\frac{1}{2})m/f_{ref}]$ seconds. If the departure exceeds the normal value, the comparison of C to $(D+E)$ produces a signal which will momentarily override the normal control of phase and frequency. This override will reduce the departure to normal limits, then cease operation.

If the counter, the number D, and the digital comparison means had an unlimited capacity, the phase would lock to one, unique relationship. However, it is not necessary for the counter to have an unlimited capacity. The counter can have a limited capacity provided that each overflow from the counter is paired with an equivalent change in $(D+E)$. When this overflow is paired, control is continuous although the counter overflows periodically. The synthesizer can operate, uninterrupted for an indefinitely long period of time.

The counter should have a capacity nearly equal to the maximum value of the frequency $f_s$ times the maximum time required to settle to equilibrium. If the counter has a capacity of this magnitude, the phase will remain locked when the frequency is switched from any value to any other value which is within the nominal band of the periodic signal source. If the capacity of this counter is too small, some auxiliary means to "capture" the reference will be necessary, as in the prior art.

Successive values of the whole number D are computed digitally. An integer $P_n-1$ is stored in a digital, phase register. At a selected time, the integer N which is indicative of the desired frequency, is added to $P_n-1$. The sum $(P_n-1+N)$ becomes the new value of P, or $P_n$ and replaces the previous value in the phase register.

The location of the decimal point (or any other radix point if another radix is used) in the phase register is implied. Therefore, $P_n$ can be read out as $(D_n+d_n)$, when $(D_n+d_n)$ is equal to $(mP_n/M)$, provided that $(M/m)$ is an integer power of ten (or integer power of the radix used). The number $D_n$ is a whole number and is the *n*th value of D and is used for the *nth* comparison of C to $(D+E)$, or more concisely to $(D_n+E)$.

If the number $(mN/M)$ is an integer, the scheduled time interval between the reference pulse edge and its complementary feedback pulse edge is constant. The electronically tuned signal source will come to equilibrium at the frequency $f_s$ for which the phase will complete N cycles in the time interval in which the reference periodic signal completes M cycles.

If $(mN/M)$ is not an integer, the periodic signal at frequency $f_s$ will also complete N cycles while the reference signal completes M cycles. However, in this case, the time interval may be scheduled to vary over the period of one cycle of the signal at reference $f_s$.

If $(mN/M)$ is not an integer and the scheduled time interval were held constant, there would be a periodic phase error. This error can be considered to be the result of spurious signals which are sidebands of the desired signals. The magnitude of these sidebands is limited and in some frequency synthesizer applications will be tolerable.

If it is necessary to reduce the magnitude of these spurious frequency sidebands, then the proper fraction $d_n$ must be utilized to schedule the feedback pulse edges.

One or more of the most significant digits in the proper fraction $d_n$ is used to drive a Digital-to-Analog Converter, DAC. The output from this DAC is superimposed upon the voltage which has a component proportional to the reference-feedback pulse edge time interval. The sense of this DAC output will tend to make the feedback-pulse-edge lag as $d_n$ increases in magnitude. The magnitude of this DAC output is scaled to be equivalent to $d_n$ times one cycle of the periodic signal.

The number of digits in the DAC is matched to the magnitude of sidebands which can be tolerated and is independent from the magnitude of the minimum frequency increment. For example, if $f_{ref}$ is 1,000,000 Hertz; $m$ is 10; M is 100,000,000, the minimum frequency increment is .01 Hertz and $(M/m)$ has seven digits; however, the DAC may be required to have only 4, 3, 2 or 1, or no DAC at all may be required.

Many different types of Digital-to-Analog Converters, DAC, are known to those skilled in the art. Many of these types would be suitable for this application. The details of the DAC are outside the scope of this invention.

In a frequency synthesizer which incorporates the DAC, not only the frequency, but the phase angle can be programmed. This requires a means for setting P to a selected value at a selected time. To illustrate this capability, assume that it is desired to synthesize a signal during the time interval $t_1$ to $t_2$ which will be indistinguishable from the signal which would have been synthesized if the frequency had been constant from some prior time, $t_0$. This capability enables the synthesizer to be time-shared among a number of frequencies in which the segments of the signals must be representative of continuous signals.

In a frequency synthesizer embodying this invention, a frequency which varies continuously in time can be synthesized. To synthesize a time-varying frequency, the fixed (for a period) integer N is replaced by a sequence of integers $M_n$. Then $(P_{n-1}+N_n)$ becomes $P_n$;

$$(P_n+N_n+1)$$

becomes $P_{n+1}$ and so on. The result is not a succession of frequency steps, but a smooth, continuous change of frequency. Similarly, there are no discontinuities in the phase nor the magnitude of the periodic signal. This continuity is due to the inherent nature of the output of the electronically tuned signal source and also due to processing of the feedback signal to this source.

The sequence of values of $N_n$ can be read from a digital memory, or can be generated wholly or in part by some intelligence such as a voice derived signal.

The sequence of values of $N_n$ can be calculated digitally to produce an exact function or to produce a tolerable approximation of some function. For example, if $N_{n+1}$ is computed to be $(N_n+F)$ and F is fixed, frequency will be swept linearly at the rate $(mF/M)$ Hertz per second (cycles per second per second). This function can be computed exactly. Alternately, if $(N_{n+1})$ is computed to be $(1\pm\alpha)N_n$, the sweep will be approximately exponential with time. This sweep will be approximate because the value $(1\pm\alpha)N_n$ will sometimes be rounded off, or truncated. However, the approximation can be in error by only an arbitrarily small amount.

BACKGROUND AND SUMMARY OF THE INVENTION

The ever-increasing number of radio communication units in use has vastly increased the demand for frequency allocation. However, in spite of the great demand, allocations continue to be made which will accommodate some deviation from specifically assigned frequencies. It has been impractical to precisely allot frequency because of the difficulty of precisely controlling the operating frequency of radio communication units. Yet, as the frequency spectrum is limited, if the continually-increasing demand for frequency is to be satisfied, allocation must be provided more precisely, and that can only be accomplished by use of systems that are capable of maintaining precise frequency control.

As indicated, a frequency synthesizer is a signal generator that is controllable to provide precise signals of different frequencies. In the past, one class of frequency synthesizers have utilized crystal oscillators (limited to a single frequency), as frequency standards from which various selected frequencies could be developed. However, these units generally have been quite complex or have been limited to the provision of several discrete frequencies.

Various forms of prior frequency synthesizers have also utilized phase lock loop techniques in which a specific signal or harmonic is selected, as from a frequency multiplier or divider. One of the difficulties of such prior units is that of effectively selecting the desired signal harmonic. Additionally, some systems of this type involve a design compromise between switching speed and resolution.

Furthermore in the operation of the units, it is sometimes difficult to avoid the introduction of spurious signals, as during periods of frequency change.

Although various forms of frequency synthesizers have been proposed in the past which probably will be used for some time to come, a need exists for an improved synthesizer that does not have the inherent disadvantages considered above, and which may be employed as a standard for various prior units. Accordingly, it is an object of this invention to provide a structure that is capable of producing a periodic electrical signal in which the phase is coherent with a periodic reference signal. In this regard, as indicated, the output from a source of periodic signals, is said to be phase coherent with the reference signal when a selected phase relationship is maintained therebetween for an indefinite period of time. In accordance with the present invention, such a relationship is maintained on the basis of phase rather than on the traditional basis of a trigonometric function of phase.

In general, the structure embodying the invention incorporates a counter to register the error or deviation within a phase lock loop, thereby preserving the phase coherent. Considering the system in somewhat greater analytical detail, it should be recognized that the exact phase of a signal cannot be continuously and exactly known. However, the phase can be known with great precision at individual sampling instants as may be defined by pulse edges. Accordingly, in a structure embodying the present invention, the numerical value of the desired phase is computed on the basis of pulse edges, which designate specific instants of time. Consequently, samples may be precise, even if the number of samples or their numerical values become exceedingly large.

An exemplary form of structure embodying the present invention may include a simple switch register for containing a number called "frequency" which specifies a phase increment, e.g. the number of cycles for the desired frequency $f$ (cycles per unit of time) of the synthesized signal. Structure is further included whereby the number "frequency" is added (cyclically) to a number that is stored in a phase register or accumulator, indicating an accumulated phase value. A phase counter is associated with the switch register and phase register structure, and receives the synthesized signal to manifest the phase of that signal by tallying cycles (or parts thereof). While the phase register may advance in relatively large jumps, as indicated above, the phase counter will advance in smaller but more frequent jumps, e.g. cycles of the synthesized-frequency signal. For example, in the synthesis of a signal having a frequency of "401" cycles (per unit of time) under exact operating conditions, the number in the phase register will jump in increments of "401" while the counter will jump in increments of "1" but at a rate "401" times as great as the rate at which the phase register jumps. Comparisons (of the contents of the phase register and the counter) at selected intervals then provide a control signal for the periodic signal source, e.g. a voltage controlled oscillator, which supplies the synthesized signal. Thus, phase error or deviation is computed digitally, then utilized to maintain capture of the desired signal.

The computed numerical value of the phase samples need not be limited to integer values. The number added to the contents of the phase register must be an integer, but the decimal point can be variously designated in the register. That is, if the "frequency" number is an integer "401," and if the phase of the signal were initially taken as zero, subsequent values could be: 401; 802; 1604; 2005; and so on. However, the frequency or switch register can be changed to vary the phase increments. In this regard, there is no theoretical limit to the smallest increment which could be employed, the increment being independent of the sampling period.

In the system as disclosed initially, herein, only the whole-number portion of the computed deviation is provided to the feedback loop. The fractional portion of the value may be ignored but is not lost. Specifically, the fractional portion of the value may be registered to accomplish the correct average frequency produced by the oscillator. Alternatively, for example, the fractional digits may be converted to an analog value for utilization in the control loop.

BRIEF DESCRIPTION OF THE DRAWINGS

In the drawings, which constitute a part of this specification, exemplary embodiments exhibiting various objectives and features hereof are set forth, specifically.

DESCRIPTION OF THE ILLUSTRATIVE EMBODIMENT

Figure 1:
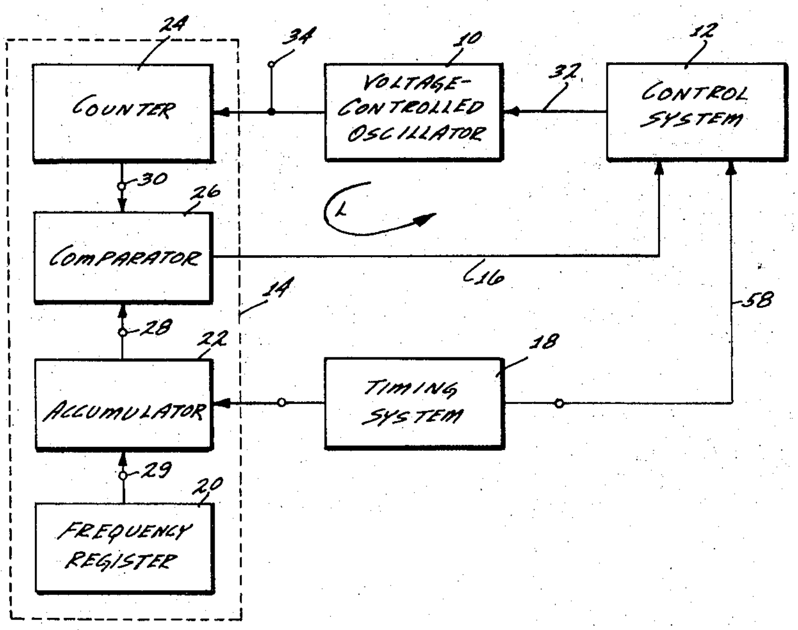
FIG. 1 is a block diagram of a system incorporating the principles of the present invention.

Referring initially to FIG. 1, there is shown a loop L incorporating a periodic signal source (in the form of a voltage controlled oscillator 10) a control system 12 and a phase unit 14. Very generally, in the operation of the system, the phase of a signal that is provided from the voltage-controlled oscillator 10 is preserved in accordance with a phase increment value that is registered in the phase unit 14. Essentially, the unit 14 provides a signal (through a conductor 16) to the control system 12 to preserve the desired phase. The operation of the control system 12 is also effected by a timing system 18 which is also coupled to the phase unit 14. The control system 12 may incorporate filtering, sample-and-hold structure, and so on, as will be described in detail below.

In the operation of the loop L, the periodic signal from the voltage controlled oscillator 10 is preserved at the desired phase which is registered (by increment) in the phase unit 14. The desired phase (and related frequency) is then accomplished and held by utilization of a control signal that is supplied from the unit 14 to the voltage controlled oscillator 10 through the control system 12. Some operational aspects of loops of this broad class are considered in detail in a book entitled "Phase Lock Techniques" by Floyd M. Gardner, published in 1966 by John Wylie & Sons, Inc.

Considering the phase control unit 14 in greater detail, the numerical value indicative of the desired phase increment (frequency) is registered in a frequency register 20. The contents of the register 20 is periodically added (as an increment) to the accumulated numerical value in a phase register or accumulator 22, under control of the timing system 18 to accomplish a value of total phase or phase displacement.

To develop a control signal, the contents of the accumulator 22 is periodically compared with the contents of a counter 24 (also in the phase unit 14) which counter manifests total phase by tallying cycles (units, fractions or multiples) of the voltage-controlled oscillator 10. Structurally, as indicated in FIG. 1, the comparison between the phase registered in the counter 24 and that of the accumulator 22 is accomplished by a comparator 26, which cyclically provides a pulse edge through the conductor 16 to the control system 12 at the instant of numerical coincidence between the two values. Consequently the instant when the pulse edge occurs (on a time base) provides information indicative of deviation from the desired phase. A control signal is thus formed for application to the oscillator 10.

Structurally, the units as broadly disclosed in FIG. 1 may take any of a wide variety of specific forms. Of course, a variety of periodic signal sources may be employed as the voltage-controlled oscillator 10. The counter 24 which tallies each cycle of the oscillator 10 may comprise a threshold circuit in the form of a Schmitt trigger, for example, or a zero-crossing detector, coupled to an incremental digital counter as well known in the prior art. The frequency register 20 may comprise a multiple-switch manually-operated register into which a selected "frequency" value can be set. Alternately, the "frequency" value can be provided from external sources as a computer or data-processing system.

The contents of the frequency register 20 as shown in FIG. 1, are transferred as parallel signals in cable 29, and accumulated (as numerical value increments) by the accumulator 22 which may comprise a digital register operatively coupled with a digital adder as well known in the prior art. Forms of such structure are disclosed in a book entitled "Arithmetical Operations and Digital Computers" by Richards, published in 1955 by D. Van Ostrand Company, Inc.

The accumulator 22 and the counter 24 are coupled to the comparator 26 through cables 28 and 30 respectively. That is, each of the digital stages in the accumulator 22 and the counter 24 are individually coupled to the comparator 26. Upon the occurrence of numerical coincidence in the values represented, a pulse edge is formed by the comparator 26, for application through the conductor 16 to the control system 12. Various forms of numerical coincidence detectors are well known in the prior art which provide a signal (pulse edge) upon the numerical identity of two sets of received digital signals. For example, a form of digital subtraction unit may be employed.

The instant at which the pulse-edge signal from the comparator 26 occurs indicates whether the voltage-controlled oscillator 10 is leading, lagging or coinciding to the desired phase. That information is utilized by the control system 12 to supply a corrective signal through a conductor 32 to the oscillator 10 so as to accomplish the desired signal (phase controlled) at a terminal 34.

Returning to a consideration of the phase unit 14 in greater detail, the counter 24 tallies each cycle of the voltage-controlled oscillator 10 as an individual unique occurrence. Of course, in most practical forms of the system the capacity of the counter 34 is limited so that more-significant digits of the tally may be lost. However, the loss of these (by overflow digits) along with the loss of similar digits of the value accumulated by the accumulator 22 still enables equivalency to be preserved so long as the capacities of the accumulator and the counter exceed the deviation that occurs between the contents.

As the counter 24 tallies cycles of the oscillator 10, an ever-increasing value is registered. Graphically, as shown in FIG. 2, (in which numerical value is plotted as an ordinate against an abscissa of time) the contents of the counter 24 is represented by the line 38 which is actually a step function; however, in the scale depicted the steps are so small that the step function appears as a smooth, straight line.

While the counter 24 tallies individual cycles to increment it's contents, the accumulator 24 is repeatedly incremented (at time of signal *tn*) by the numerical value contained in the "frequency" register 20. Consequently, the numerical value developed in the accumulator 22 may be depicted by the step function 40 as shown in FIG. 2, each step manifesting an increment in phase displacement.

In the operation of the system, the average numerical value in the counter 24 coincides to the average numerical value in the accumulator 22. That is, the voltage-controlled oscillator 10 is slaved to a "frequency" (phase increments) contained in the register 20, by the comparator 26 sensing deviations to provide control through the control system 12 to the oscillator 10.

Figure 2:
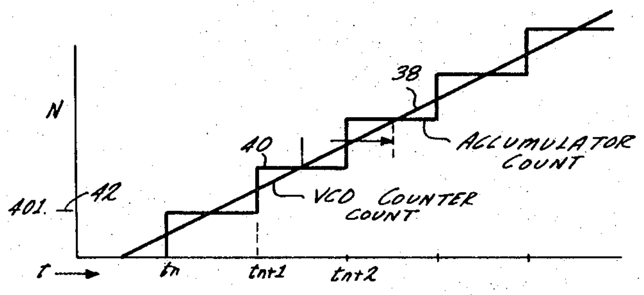
FIG. 2 is a graph illustrative of one operating aspect of the system of FIG. 1.

Analyzing the graph of FIG. 2 in greater detail, assume the level 42 designates a numerical phase value of a multiple of "401." Assuming a "frequency" value of "401" is contained in the frequency register 20, then during a passage of each interval T, as indicated, the contents of the accumulator 22 is increased in value by the amount "401." Coincidentally, during an interval T, the counter 24 (at sync) will tally "401" individual cycles of the oscillator 10. Thus, the curves should coincide at the end of the interval T (precise center between instants *tn*). Deviations from that relationship result in a correction signal to adjust the speed (frequency) of the oscillator 10 thereby restoring the desired phase relationship.

Figure 3:
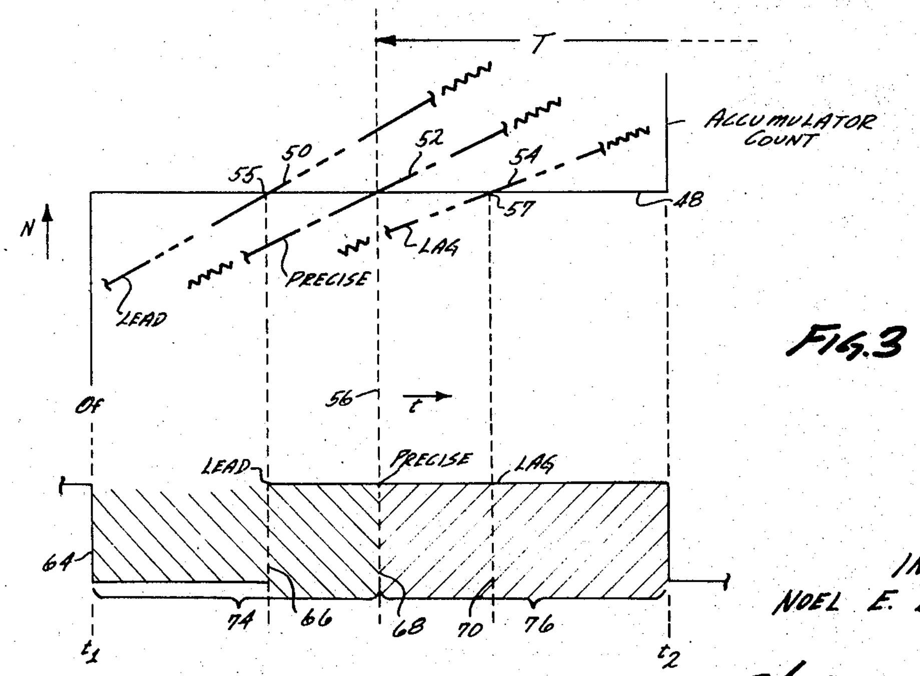
FIG. 3 is a graph directed to an enlarged fragment of the graph of FIG. 2.

The operation of the comparator 26 in cooperation with the control system 12 and the timing system 18 to control the oscillator 10 is presented more graphically in FIG. 3, the upper portion of which is an enlarged fragmentary view of the graph of FIG. 2, showing a single step 48 in the step function 40 (FIG. 2) as related to three different curves 50, 52, and 54 each of which represents one operating condition of the oscillator, manifest as a positional relationship of the line 38 (FIG. 2). An interrelated curve is shown below the step function 40 in time scale association.

Analyzing the curves, the line 52 (upper section) is shown to pass substantially through the center 56 of the plateau of the step 48. This depicts precisely the desired phase relationship wherein the phase value contained in the counter 24 (FIG. 1) precisely coincides to the value in the accumulator 22 at precisely the mid-point of the timing interval provided by the timing system 18. That is, as the timing system 18 provides pulse edges *tn* which define the transitional states to and from the step 48, a precise phase relationship is indicated to have occured when the counter 24 (curve 52) attains a numerical value coinciding to that in the accumulator 22 at precisely the mid-point between the step edges, e.g. at the center 56 of the step 48.

In the event that the oscillator 10 is operating too fast, the phase value in the counter 24 will lead the numerical content of the accumulator 22. This situation is depicted by the curve 50 (FIG. 3) in which the counter 24 is shown to have reached a value that is greater than the value in the accumulator 22 at the instant designated by the step center 56.

As a directly related consideration, it may be seen that the instant (indicated by an intersection 55) of numerical coincidence occurs well prior to the center 56 of the step 48. In this regard, it is apparent that the degree of time displacement from the center (time-base offset) is directly related to: the relationship between the curves, or the relationship of the two tallies, and also indicates the correction that is required to establish phase identity.

Contrary to the leading situation depicted by the curve 50, the curve 54 represents the lagging situation in which the oscillator 10 is running slow, e.g. is phase delayed with respect to the accumulator 22. The time scale relationship is again apparent in that the interval indicated on the time base between the center 56 and the intersection 57 is representative of the phase deviation and consequently the requisite correction.

Figure 4:
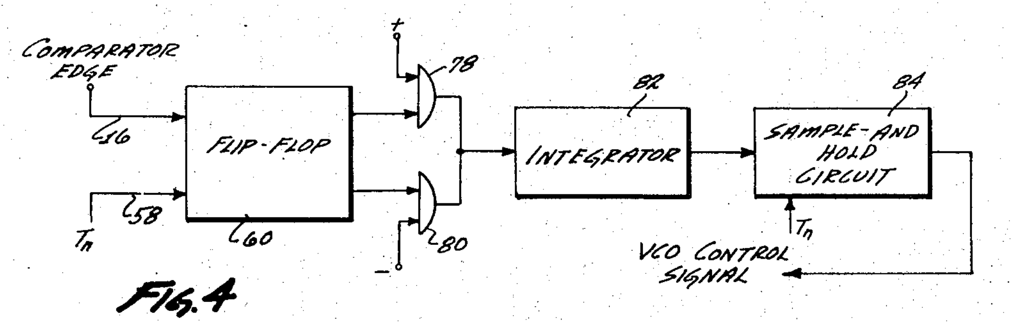
FIG. 4 is a block diagram of a portion of the system of FIG. 1.

A wide variety of different structures may be employed in the control system 12 (FIG. 1) to control the oscillator 10 in accordance with the information as depicted in FIG. 3. One exemplary form of such structure is shown in FIG. 4 and will now be considered in detail. A clock or timing signal (from the timing system 18, FIG. 1) is supplied through a conductor 58 to a flip-flop 60 (FIG. 4) which also receives the pulse edges that indicate the instant of numerical coincidence, e.g. intersections 55 and 57 (FIG. 3) that is provided from the comparator 26 (FIG. 1).

The flip-flop 60 is set by a timing signal *tn* occurring in conductor 58 at the instant designated by the edge 64 (FIG. 3). Subsequently, a pulse edge in the conductor 16 (FIG. 4) indicating the coincidence, will change the stage of the flip-flop 60 at the instant indicated for example by the phantom-indicated edges 66, 68 or 70 (FIG. 3).

Phase identity, as indicated above, occurs when the contents of the counter 24 coincides to the contents of the accumulator 22 at a time represented to fall precisely at the center 56 of the step 48 (FIG. 3) as indicated by the curve 52. The instant when the curve 52 crosses the step 48 is manifest by a pulse edge from the comparator 26 (FIG. 1) which resets the flip flop 60 (FIG. 4). Translating the curve 52 to the lower portion of FIG. 3, it may be seen that under these circumstances the duration 74 coincides to the duration 76. The identify of these time intervals indicates a balance condition where no correction is to be applied to the oscillator 10 (FIG. 1).

As shown in the combined portions of FIG. 3, if a leading situation occurs, the flip-flop 60 is restored at an earlier time (indicated at edge 66) by the signal in the conductor 16 occurring when the curve 50 crosses the step 48 at the intersection 55. Conversely, in the event of a lagging situation, the pulse edge in the conductor 16 is delayed to the time of the intersection 57, when the curve 54 crosses the step 48 with the result that the flip-flop is restored at a later time indicated at edge 70. Thus, summarizing the time relationship of the two states (set and reset) of the flip-flop 60 indicates either a phase lagging or a leading situation. If there is a time balance there is no deviation. A shorter duration for the set state indicates a leading situation, while a longer duration indicates the contrary.

As shown in FIG. 4, the flip-flop 60 controls a pair of gates 78 and 80 which are connected to supply positive and negative ccrrents respectively to an integrator 82, the output of which is supplied to a sample-and-hold circuit 84. Relating the operation of the structure shown in FIG. 4 to the graph of FIG. 3, it may be seen that each state of the flip-flop 60 respectively qualifies one of the gates 78 or 80. The gate 80 is initially qualified, for the duration 74 (FIG. 3) while the gate 78 is qualified for the duration 76. In an equilibrium situation, the current supplied to the integrator 82 during the duration 74 coincides precisely to the current passed through the gate 78 during the duration 76. As a result, the integrator 82 receives no net change in signal level so that subsequently when the output from the integrator 82 is sampled at the next step edge by the sample-and-hold circuit 84, no change occurs to vary the speed of the oscillator 10.

Considering the leading situation, where the oscillator 10 is fast, the duration of qualification for the gate 80 is greater than the period during which the gate 78 is qualified. As a result a net increase in signal level is accomplished for the integrator 82 which when subsequently sampled by the sample-and-hold circuit 84 (as well known in the prior art) will provide a VCO control signal that will reduce the speed of the oscillator 10. The opposed lagging situation (wherein the oscillator 10 is operating too slow) results in a lesser duration for the reset state of the flip flop 60 resulting in a net negative change in the integrator level 82 thereby producing a signal to the sample-and-hold circuit 84 to increase the speed of the oscillator 10.

The structure of FIG. 4 may be variously embodied wherein the integrator 82 incorporates a filter and may also incorporate phase-inversion circuits. The sample-and-hold circuit 84 obtains the desired time relationship between the application of a control signal to the oscillator 10 (FIG. 1) and the instant of sampling (immediately after *tn*). Further with regard to timing relationships, the timing signals *tn* are provided by the system 18, to condition the accumlator 22 for accepting the phase increment from the register 20. The timing signals *tn* also initiate the subsequent interval of comparison for the contents of the counter 24 with that of the accumulator 22. If desired, separate external timing signals may be provided to define the accumulation interval prior to the comparison interval as well known in the prior art.

The explanation above of the system of FIG. 1 assumed the existence of an integer "frequency" or phase-increment number in the frequency register 20. Of course, such an integer is related to the periodicity of signals from the timing system 18 for translation into Hertz. Specifically, for example, a numerical value of "401" in the register 20 would manifest a frequency of 401,000 Hertz providing the timing system 18 produced pulses *tn* with leading edges spaced apart by one millisecond. However, it may be desirable to provide fractional values of the "frequency" number in the register 20 with regard to the operating time interval. Specifically, pursuing the above axample, it may be desirable to provide a value of "401.240" in the register 20. However, as the counter 24 does not tally fractional cycles the operation of the comparator 26 is limited to integers. In the event a fractional value of ".240" is contained in the register 20, the repeated accumulation of such a fraction value periodically propagates an overflow digit into the integer portion of the value. Specifically, upon the accumulaton of five fractional values, ".240" an overflow will occur into the "ones" digit of the accumulated value. Consequently, in the accumulation of fractional values, a residual error or deviation is developed which is corrected only on the occurrence of an overflow into the integer portion of the number. As a result, phase deviations are tolerated, accompanied by sudden corrections. Such a mode of operation tends to develop spurious components in the output signal. One form of the present invention utilizes an open loop compensation feature to avoid the re-occurring deviation resulting from the fractional residue accumulation. A detailed illustrative system is presented in FIG. 5 and will now be considered.

A basic control loop L is shown which functions in a manner somewhat similar to that previously described. That is, an oscillator 100 or other periodic signal source provides an output to a terminal 102 and coincidentally to a digital register 104 indicated to include six numerical stages ($V_1$–$V_6$) for tallying cycles of the oscillator 100. The register 104 may include a threshold circuit and is connected, stage-by-stage to a comparator 106 along with the stages $\phi_1$–$\phi_6$ of an accumulator 108. It is to be noted, that the accumulator 108 incorporates an integer section 110 (stages $\phi_1$–$\phi_6$) and a fractional or residue section 112 ($\phi_A$–$\phi_D$). The digit positions of the comparator 106 are designated $C_1$–$C_6$, in coincidence with the stages $V_1$ through $V_5$ of the register 104 and $\phi_1$ through $\phi_5$ of the accumulator 108. The residue or fractional digits contained in the accumulator section 112 as indicated are designated $\phi_A$, $\phi_B$, $\phi_C$, and $\phi_D$.

The phase increment, or "frequency" number is contained in a register 114 including integer digital stages $I_1$–$I_4$ and residue or fractional digital stages $I_A$, $I_B$, $I_C$, and $I_D$. The register 114 receives increment values from a data system 115 by means of cables 117 and 118. The data system may take many forms including that of a general purpose computer for providing phase-related signals and for varying signals in the register 114 whereby to represent the desired instant phase increment. The register 114 has outputs connected to the accumulator 108 through a cable 116 which preserves the orderly transfer of individual digital-stage signals to the accumulator. The accumulator 108 increments its contents by the number contained in the register 114 upon each occurrence of a timing signal $P_1$ (FIG. 6) from a timing pulse generator 118. On occurrence of the following timing pulse $P_2$, the comparison is initiated then subsequently at pulse $P_3$, the developed control signal is sampled for application to the periodic signal source 100.

Figures 5, 6:
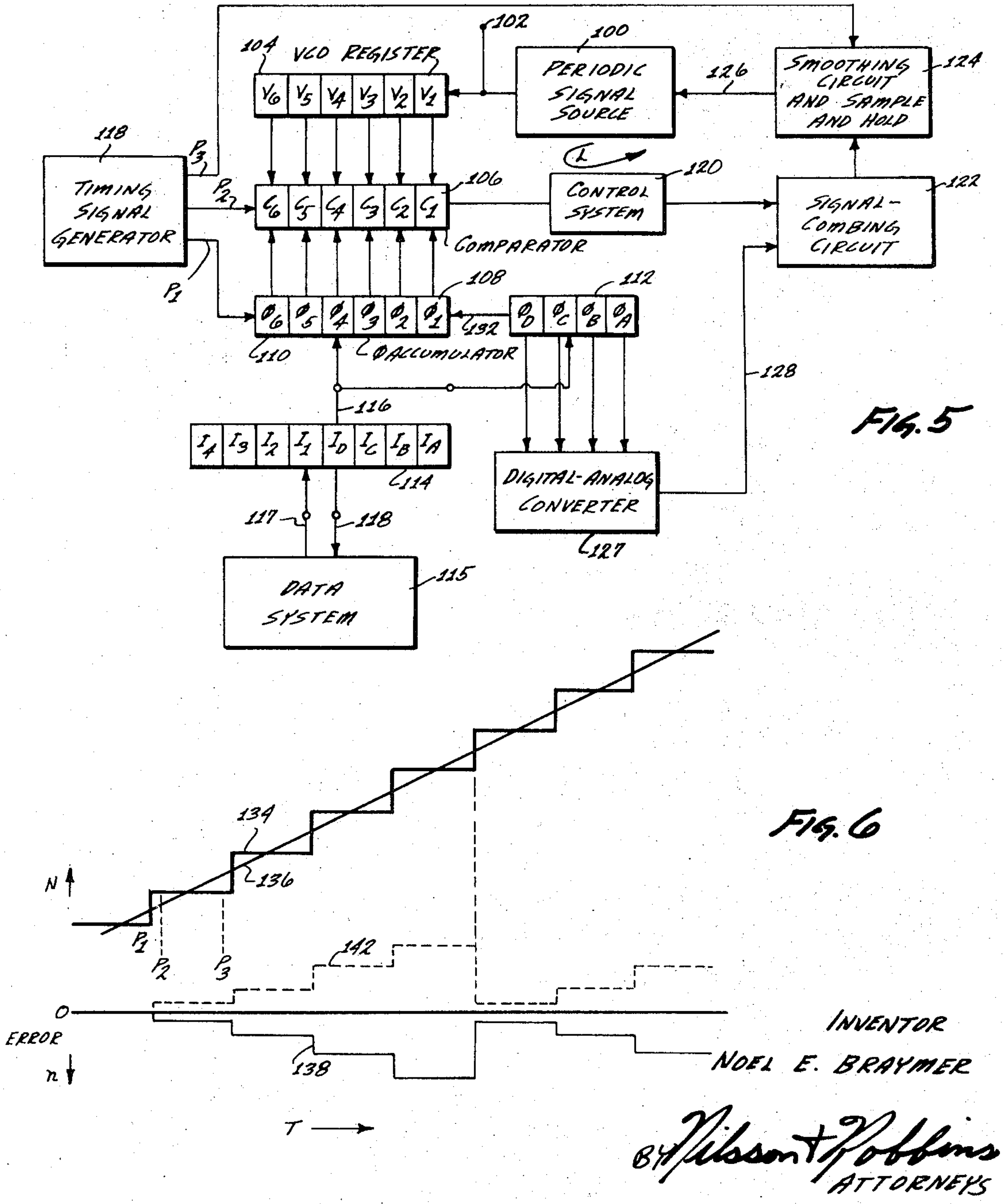
FIG. 5 is a block diagram of an alternative system inporating the principles of the present invention.
FIG. 6 is a graph illustrative of an operating aspect of the system of FIG. 5.

In the system of FIG. 5, the operation of the comparator 106 to provide an indication of coincidence between the values registered in the register 104 and the accumulator 106 may be similar to that operation as described in the above-described system. The signal from the comparator 106 is supplied to a control system 120 as disclosed above for developing an output indicative of deviation, which signal is supplied to a signal-combining circuit 122 for subsequent application to a smoothing and sample-and-hold circuit 124 from which the oscillator 100 receives the control signal through conductor 126. Operation of these circuits is timed.

In general, the system of FIG. 5 accommodates fractional values of the "frequency" number (phase increment values) which fractions are accumulated in the accumulator section 112. The residue value manifest by digits $\phi_A$–$\phi_D$ acts through a digital-to-analog converter 126 to provide an output to the signal-combining circuit 122 (through a conductor 128).

The operation of the basic loop is graphically illustrated in the upper portion of FIG. 6, wherein the step function 134 depicts the operation of the accumulator 108 while the substantially-straight line 136 depicts the incremental accumulation of the register 104. Again, the relative magnitude of the individual steps by the register 104 are such that they are lost in the presentation of FIG. 6.

Considering a "frequency" number having a fractional value of ".240" the fractions are accumulated in the residue accumulator section 112 (FIG. 5) until an overflow digit is propagated through the conductor 132 to the "ones" stage of the accumulator 108. During the interval when a value is accumulated in the fractional section 112, the basic loop L tolerates a certain deviation. That is, the residue or fractional value which is accumulated in the integrator section 112 is not active in the basic loop L therefore, the loop tolerates a deviation proportionate the accumulated residue.

Relating this situation to the graphical presentation of FIG. 6, an indication of the residue deviation is indicated in the lower portion of the graph in an expanded vertical scale. Specifically, with reference to zero level, a curve 138 depicts the error or residue deviation developed from a fractional value of ".240" in the "frequency" number. It is to be emphasized that the curve 138 is plotted only in time relationship with the upper portion of the curves 134 and 136. In this regard, the magnitude relationship scales are totally different, the upper portion of the graph being plotted with reference to an integer scale N and the lower portion being plotted with reference to a fractional scale *n*.

Pursuing the graph, and assuming the fractional value of ".240" in the digit stages $I_A$–$I_D$, each step in the function 134 results in the accumulation of a fraction ".240" in the residue section 112 ($\phi_A$–$\phi_D$). As a result, assuming a starting point of zero, five accumulations are required to propagate an overflow from digital stage $\phi_D$ of fractional section 112 (FIG. 5) through the conductor 132 to the integer section 108. The accumulated value in the digit stages $\phi_A$–$\phi_D$, as indicated, actually represents a deviation from the desired phase as tallied in the integer stage $\phi_1$–$\phi_6$. The deviation is indicated by the curve 138.

The residue, accumulated in the residue section 112, as indicated above, results in a proportionate deviation in the loop L. To compensate this deviation, the residue section 112 is sensed by the digital-analog converter 126 to provide an analog value as represented by the curve 142 in the lower portion of FIG. 6. That is, as the deviation or error of concern is manifest by the residue section 112, that section can provide an analog signal for combination with the output from the control system 120 to correct the residue or fractional deviation. Thus, residue accumulations resulting from a fractional value in the "frequency" number are anticipated prior to the time when a digit is propagated into the "ones" stage $\phi_1$ of the accumulator 108, and are employed to provide a compensatory control signal.

Referring to FIG. 5, it is to be noted that when a "one" digit is propagated from stage $\phi_D$ of the accumulator section 112, the value therein drops with a commensurate reduction in the output from the converter 126. As a result, the input to the signal-combining circuit 122 from the control system 120 rises somewhat; however, the input to the signal combining circuit 122 from the analog-digital converter 126 drops. As a result, the compensation is smooth.

From a consideration of the embodiments described herein it will be apparent to those skilled in the art that the system hereof may be implemented in a variety of structural forms as a relatively simple yet highly accurate frequency synthesizer which is capable of operating to accomplish fractional cycle control. That is, the system is capable of operating to control phase as by a computer output for example, wherein the program specifies fractional cycles of phase. Such capability coupled with the system's stability and economy affords a significant improvement over prior systems.

The system as defined in greater structural detail by the claims has certain functional aspects of considerable importance. Specifically, the aspect of tallying phase, as disclosed herein, for comparison with a desired standard so as to compute a correction is quite significant. The capabilities of the system to accommodate fractions, to maintain capture and to afford digital accuracy should also be noted.

What is claimed is:

1. A frequency synthesizing system wherein a source provides a periodic signal, which signal is monitored in relation to a predetermined phase comprising:
   - means for digitally counting cycles of said periodic signal from said source;
   - means for providing digital signals indicative of phase increments for said periodic signal to accomplish said predetermined phase;
   - digital accumulating means for accumulating said signals indicative of phase increments; and
   - means for comparing the contents of said means for digitally counting and said accumulating means to provide a control signal to said periodic signal source.

2. A system according to claim 1 wherein said periodic signal source includes a signal-controlled oscillator and wherein said control signal regulates the frequency thereof.

3. A system according to claim 1 further including timing control means to cyclically define intervals of operation for said accumulating means and said means for comparing.

4. A system according to claim 1 wherein said means for comparing includes a detector for providing a time-modulated pulse edge.

5. A system according to claim 4 further including means for holding a signal indicative of said pulse edge for utilization in controlling said periodic signal source.

6. A system according to claim 5 wherein said means for holding includes a sample-and-hold circuit.

7. A system according to claim 1 wherein said accumulating means and said means for providing digital signals indicative of phase increments include digital stages for integers and digital stages for fractions.

8. A system according to claim 7 further including means to provide a supplemental control signal for said periodic signal source from at least one of said digital stages for fractions.

9. A system according to claim 8 wherein said means to provide a supplemental control signal includes a digital to analog converter.

10. A system according to claim 9 further including a means for holding a signal indicative of said pulse edge for utilization in controlling said signal source.

11. A system according to claim 1 wherein said means for providing digital signals comprises a variable digital register.

12. A system according to claim 11 further including at least one source of phase-related signals and further including means for applying said phase related signals to alter the contents of said variable digital register.

13. A system according to claim 11 further including means to provide signals representative of phase increments to said variable digital register whereby to represent a frequency which is varied as a function of time in a prescribed manner.

14. A system according to claim 1 further including a timing system to cyclically define at least first and second times; means for controlling said digital accumulating means to operate at said first time; and means for controlling said means for comparing to operate at said second time.

No references cited.

JOHN KOMINSKI Primary Examiner

U.S. Cl. X.R.

331—14, 18